D. Sutton.
Felting Machine.
No 6607X Patented Jun. 13, 1831.
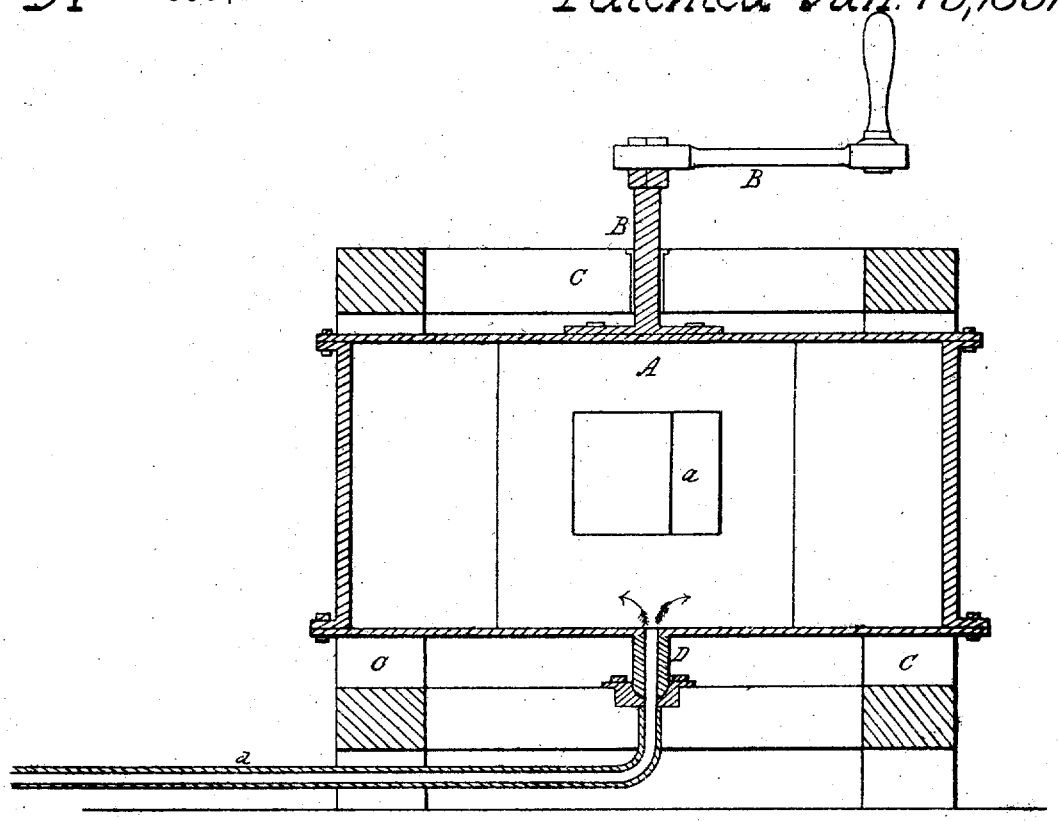
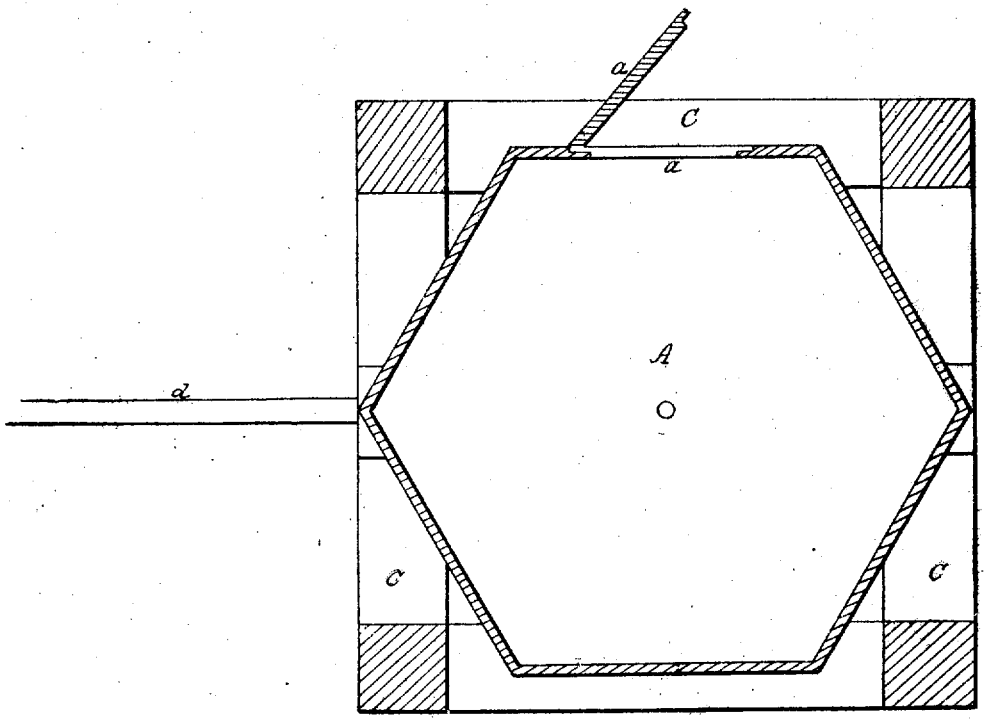

David Sutton 6607X
Letters Patent 6/13/1831

The Schedule referred to in these Letters Patent and making part of the same containing a description in the words of the said David Sutton himself of his improvement in the art of sizing hat felts and napping or coating the exterior of hat bodies with fur by steam.

— — To all to whom these presents shall come — — —
Be it known that I David Sutton of Lancaster, County of Garrard and State of Kentucky. have invented a new and useful improvement in the art of sizing hat felts and napping or coating the exterior of hat bodies with fur by steam. and that the following is a full and exact description of the construction and operation of said machine and of its application to the purposes claimed by me. 1st A boiler in which the steam is generated. that will contain fifteen gallons. the size of which however may be enlarged or diminished to suit the quantity of work to be performed — the boiler may be made of sheet iron or any other suitable material, the form of which is not material. on which is fixed a safety valve to prevent too great an accumulation of steam —
2nd An Octagon or hexagon cylinder with two flat ends 24 inches apart. 4 feet in diameter which may be enlarged or diminished (without paying much regard to these proportions) so as to accomodate it to the work to be performed, in which is a small door made tight; by which the hat felts or bodies are passed into it — in the center of one end of this cylinder is a gudgeon upon which is fixed a crank 18 inches long by means of which when the cylinder is placed on a suitable frame for the purpose it may revolve by the hand — in the centre of the other end of the
cylinder

6/13/1831 6607X cylinder is a hollow gudgeon 3^d. A frame of any conven-
ient construction in which irons for the gudgeons of the cyl-
inder are placed. 4^th. A small tube or pipe made of cop-
per or other suitable material by which the steam is convey-
ed from the generator through the hollow gudgeon into
the cylinder. 5^th. After sticking the napping or coating
on the hat bodies they are then placed in the cylinder in
a wet state, the cylinder having no water in it, the
steam is then let into the cylinder as above described, after
it becomes hot it is then revolved by means of the crank a
short time, say from twenty to thirty minutes (according to
the fur you nap with; thus by the power of the steam and
the revolution of the cylinder the body is prepared to kind-
ly receive the nap and it is forced into the body in
a neat and durable manner - as many hats may be
placed into the cylinder as can be revolved. 6^th To re-
duce or size hat felts either wool or fur after they are shrunk
a little say one eighth they are placed in the cylinder -
in a wet state (the cylinder having no water in it) the
steam is then let in upon them until they are made hot
and then by revolving the cylinder a short time say
about twenty or thirty minutes they are reduced to the
proper size for napping or coating. Now that to
which I claim the right of exclusively using or vending
to others to be used. is the Application of steam as above
described to the reducing or sizing of hat felts either wool
or fur and the napping of hat bodies either wool or fur.
Witnesses Tho^s Millan
Franklin Garrett David Sutton Exd.
M.F.C.

6607X